Figure 1:
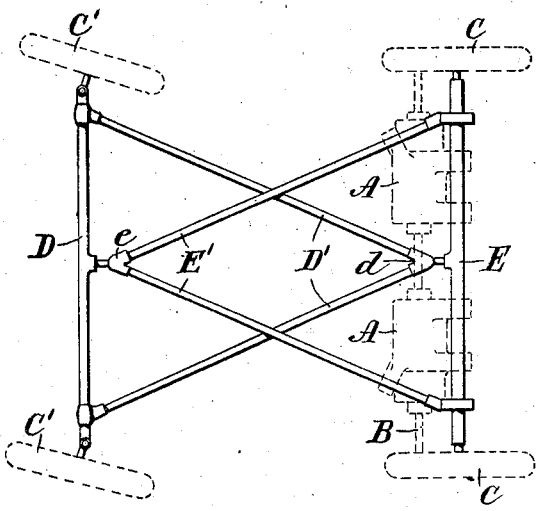

No. 859,516. PATENTED JULY 9, 1907.
H. M. POPE.
MOTOR VEHICLE.
APPLICATION FILED SEPT. 10, 1903.

Witnesses
Edgeworth Greene
Lucius Varney

Inventor
Harry M. Pope
By his Attorneys
Redding Kiddle & Greeley

UNITED STATES PATENT OFFICE.

HARRY M. POPE, OF CHICOPEE FALLS, MASSACHUSETTS, ASSIGNOR TO ELECTRIC VEHICLE COMPANY, OF JERSEY CITY, NEW JERSEY, A CORPORATION OF NEW JERSEY.

MOTOR-VEHICLE.

No. 859,516.     Specification of Letters Patent.     Patented July 9, 1907.

Original application filed October 23, 1899, Serial No. 734,420. Divided and this application filed September 10, 1903. Serial No. 172,562.

*To all whom it may concern:*

Be it known that I, HARRY M. POPE, a citizen of the United States, residing in Chicopee Falls, county of Hampden, State of Massachusetts, have invented certain new and useful Improvements in Motor-Vehicles, of which the following is a specification, reference being had to the accompanying drawings, forming a part hereof.

This invention relates to the running gear frames of motor vehicles, the present application being a division of an application filed October 23, 1899 and serially numbered 734,420 for improvements in motor vehicles. The conditions of use of such vehicles impose requirements of construction quite different from those which have to be met in draft vehicles. The weight of the motor and driving mechanism must be properly supported and should be supported independently of the body of the vehicle or that portion upon which the occupants are seated. The motor, driving mechanism or connections and driving wheels should also be supported and connected by a rigid, unyielding frame which will maintain exact alinement of the parts under all conditions. At the same time the four wheels of the vehicle must be capable of adapting themselves to a warped or uneven road surface and as the steering wheels are mounted independently upon a relatively fixed axle which stands always in a vertical plane substantially parallel with a vertical plane which includes the axis of the driving wheels, there must be such a connection between that part of the frame which supports the motor and driving wheels and the other part as will permit of a relative displacement of such axle and axis in such parallel vertical planes in order that the wheels may accommodate themselves to an uneven road surface. This connection should also be of such character as to absorb to some extent the vibrations of that portion of the frame which supports the steering wheels or should at least prevent their transmission to the other part of the frame, while it should not be a loose connection such as would allow wear and permit rattling. The axle of the driving wheels in particular should also be braced so as to resist strains in a horizontal direction. In the present case it has been sought to devise a form of running gear frame which shall meet these several requirements while capable of modification in form and arrangement to meet different requirements of use.

Figure 2:
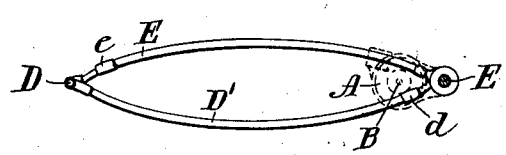
Figure 3:
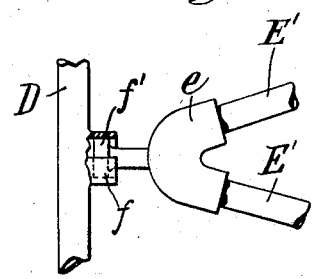

In the drawings.—Figure 1 is a diagrammatic plan view representing a running gear frame made up of two substantially triangular parts, the motor, driving connections and wheels being indicated. Fig. 2 represents in side elevation the running gear frame shown in Fig. 1, and, Fig. 3 is a detail view of a form of connecting device which may be employed between the two parts of the frame.

As represented in the drawings, the frame comprises two parts which are so connected as to permit relative oscillation or displacement about a longitudinal axis, while the two axles are held from relative displacement in a horizontal plane. One of such parts supports the motor A, driving connections B, and driving wheels C always in the same relation, this part of the frame being rigid and unyielding so as to prevent relative displacement of the several bearings supported by it. The other part of the frame supports or includes the axle D upon which are mounted the independent pivoted steering wheels C'. Each part of the frame, as shown, spreads from its connection at one end, to a wide or double connection to the axle at the other end, being essentially triangular in that it has three points of support or suspension, one at its apex where connection with the other part of the frame is effected and the other two in a line which forms the base of the triangle and corresponds with or is parallel with the axis of the driving wheels, but in actual form it may depart more or less from a triangle so far as its side members are concerned. Whenever, therefore, mention is made hereinafter of a triangular frame it will be understood that such mention is made with reference to the arrangement of the points of support or suspension rather than the actual form.

In the form shown in the drawing both parts of the frame are triangular in form, the part D' having as its base the relatively fixed axle D upon which are mounted the independent steering wheels C', and being connected at its apex *d* to the axle E of the driving wheel C at a single point. The said axle E forms the base of the other part E' which is likewise connected at its apex *e* to the axle D also at a single point. The part E' of the frame supports the motor A, driving wheels C and driving connections B in the same relations under all conditions and is itself rigid and unyielding. The form of connection between the two parts, at *d* and at *e*, may be of any suitable character which will afford flexibility in a vertical plane, that is, which will permit relative oscillation of the two axles about a longitudinal, horizontal axis. It may consist, for example, as shown in Fig. 3, of a socket *f* carried by one part and engaged by a head *f'* carried by the other part. In this form the two parts D' and E' the one overlapping the other, are arched in opposite directions, as clearly shown in Fig. 2, in order to prevent interference between the two parts as the two axles are relatively displaced in parallel, vertical planes to enable the wheels to adapt themselves to a warped or uneven road surface. The axle D which supports the independent steering wheels is held from displacement in a horizontal plane by the side members of the part of the frame to which it belongs. This construction of the running gear frame particularly affords a convenient way of mounting and supporting the motors. For instance, it is sometimes very desirable to have the motors mounted with their axes in the same horizontal plane as the rear axle, and, upon reference to Fig. 2, it will be seen clearly that the springing or arching of the two reach members D' and E' permit the motors to be mounted in this way. In mounting the motors they are preferably supported from the side members of the reach E' and from the rear axle, the pivot d on the other reach D' being connected to the axle E at a point between the motors. It will be observed that in this double triangular frame there is a central longitudinal line which will have at all points a minimum of displacement relative to the body which may be superimposed upon the running gear frame, and that the motor controlling devices, brake operating devices and steering mechanism, all of which must be operated from the body of the vehicle, can be disposed as desired along such line without being materially affected by relative movement of the body and running gear.

Various modifications of the general form of the improved running gear frame will readily suggest themselves in view of the foregoing, and it is therefore to be understood that this invention is not limited to the precise arrangements shown.

I claim as my invention:—

1. In a motor vehicle having forward and rear axles and in which the forward axle is provided with independent pivoted steering wheels, a pair of reach members intermediate the axles maintaining said axles in parallelism, one of said reach members engaging by a horizontal pivot connection the front axle and spreading to a double connection with the rear axle, and the other reach member engaging by a horizontal pivot connection the rear axle and spreading to a double connection with the front axle, said horizontal pivot connections having their axes arranged substantially in the planes of said axles and with the other reach connections.

2. In a motor vehicle, the combination with a running gear frame comprising axle members and a pair of reach members, one of said reach members engaging by a pivot connection the rear axle, and the other of said reach members engaging the front axle and spreading to a double connection with the rear axle, of a motor detachable without the disconnection of the reach member and axle supported from the rear axle and one of the reach members and disposed between that reach member and said pivot connection on the other reach member.

3. In a motor vehicle, the combination with a running gear frame comprising axle members and a pair of reach members, one of said reach members engaging by a pivot connection the rear axle, and the other of said reach members engaging the front axle and having two side members which form a double connection with the rear axle, of two motors detachable without the disconnection of axles and reach members and supported each from the side members, respectively, and the rear axle, said pivot connection on the other reach member being connected to the rear axle at a point between the motors.

4. In a motor vehicle, the combination with a running gear frame comprising axle members maintained in parallelism by reaches and a pair of reach members having all their connections in substantially the same plane, said reach members sprung out of the plane of the axle members, of a motor mounted upon said frame with its axis in the same horizontal plane as said axle members.

This specification signed and witnessed this 2nd day of September, A. D., 1903.

HARRY M. POPE.

In the presence of—
F. C. ROSS,
HERMANN F. CUNTZ.